Aug. 21, 1923.

D. A. FLYNN 1,465,469

DIFFERENTIAL GEARING

Filed July 12, 1922  4 Sheets-Sheet 1

Inventor,
Daniel A. Flynn
By Geo. U. Taylor
his Atty.

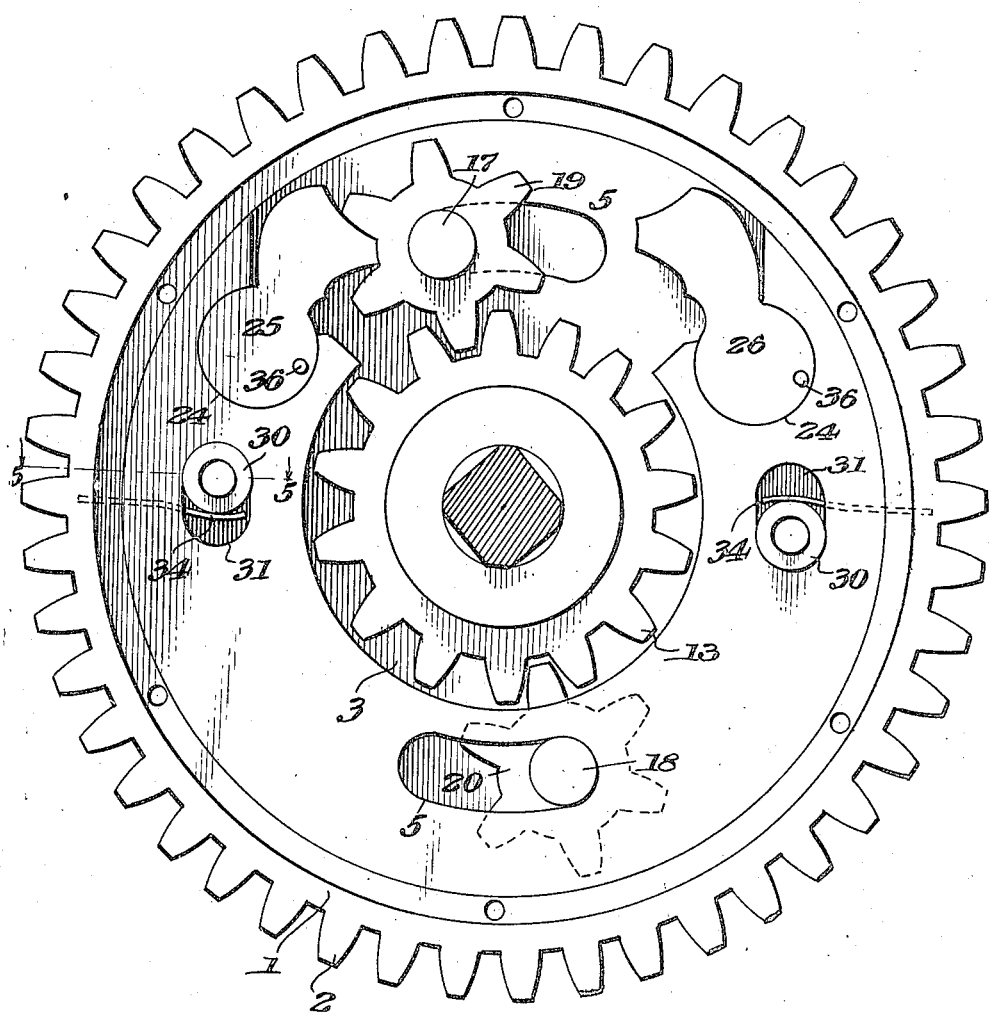

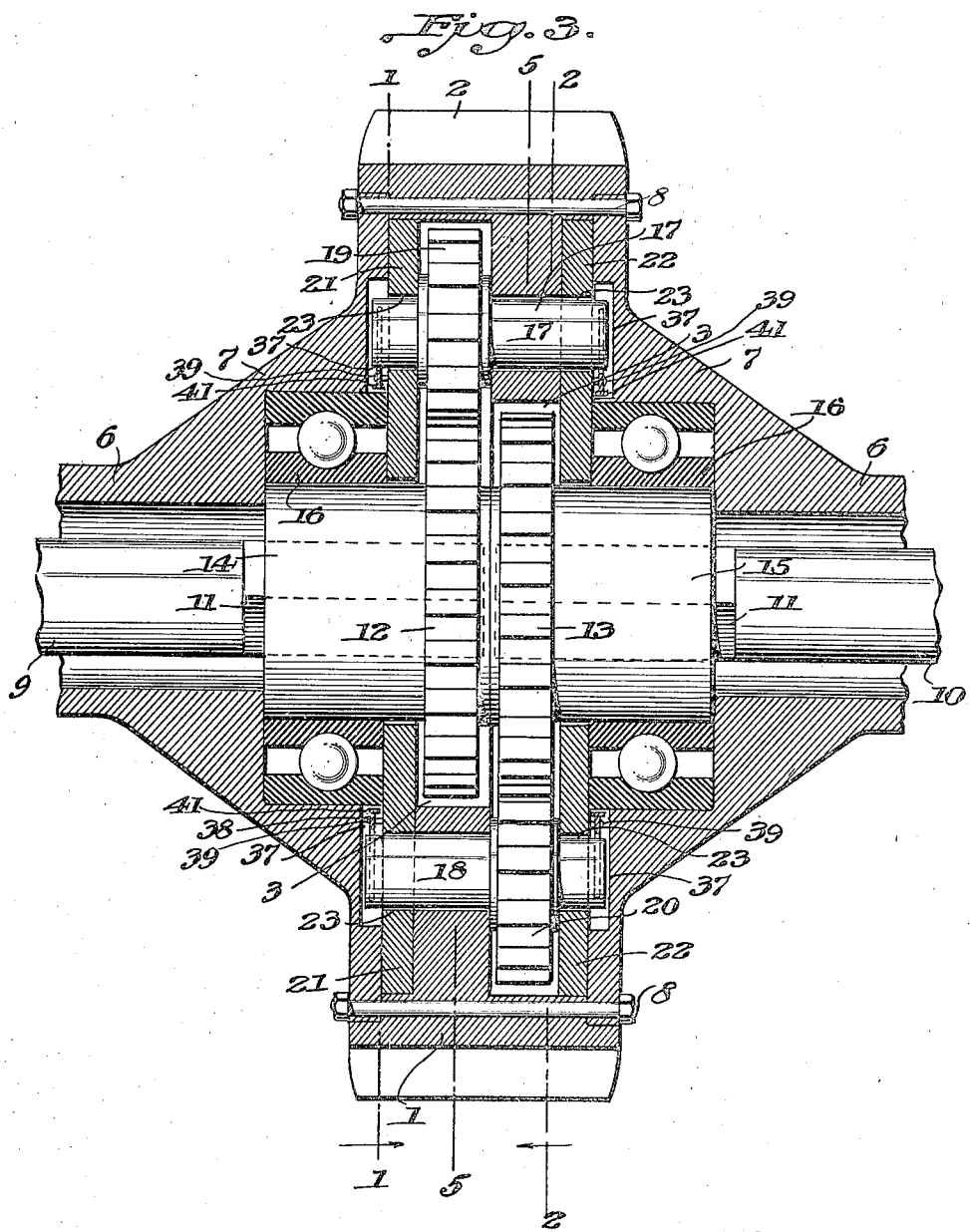

Aug. 21, 1923.  
D. A. FLYNN  
1,465,469  
DIFFERENTIAL GEARING  
Filed July 12, 1922 4 Sheets-Sheet 4
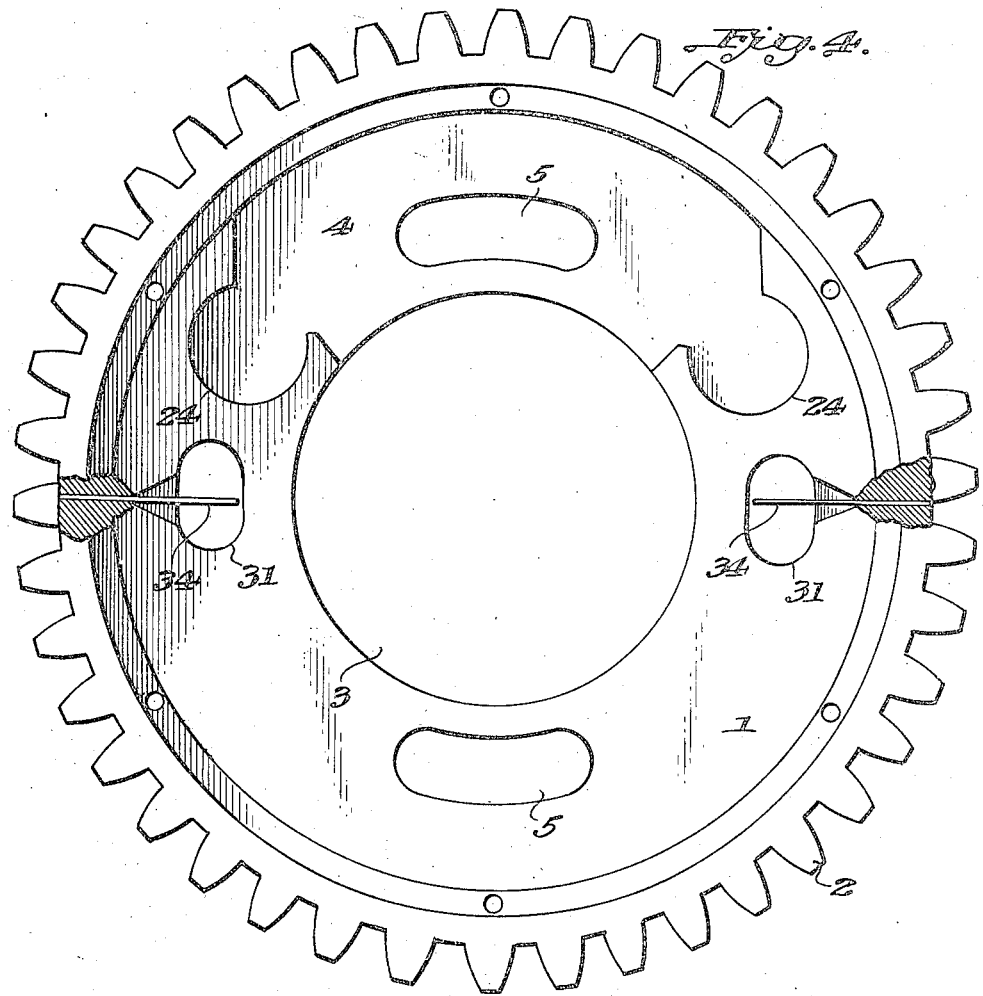
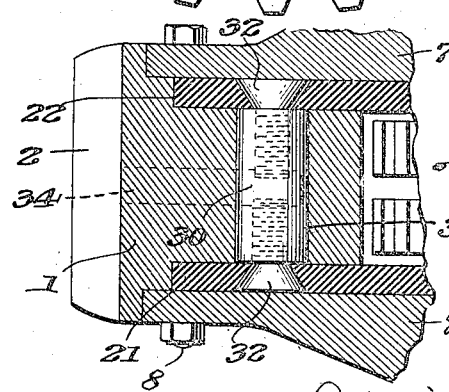

Patented Aug. 21, 1923.

1,465,469

UNITED STATES PATENT OFFICE.

DANIEL A. FLYNN, OF MECHANICSVILLE, NEW YORK.

DIFFERENTIAL GEARING.

Application filed July 12, 1922. Serial No. 574,384.

*To all whom it may concern:*

Be it known that I, DANIEL A. FLYNN, a citizen of the United States, residing at Mechanicsville, in the county of Saratoga and State of New York, have invented certain new and useful Improvements in Differential Gearings, of which the following is a specification.

This invention relates to differential gearing, particularly adapted for use in connection with the driving axles of an automobile or truck.

The object of my invention is the provision of an improved differential gearing of few parts, simple, strong, and durable construction, arranged to withstand the strains and stresses to which a gearing of this character is subject, which will apply the driving power to both of the axle shafts regardless of the tractive adhesion of the wheels of the automobile or truck and will also perform all of the usual differential functions demanded of a differential gearing used on an automobile or truck.

The invention comprehends the novel general combination of gears, dogs, and dog-operating rings or disks of which an example is hereinafter described and, further, the novel combination of dog gear and dogs and, also certain improved means cooperating with the gears set forth.

The invention also comprises those particular elements and combinations embodied in the form of the invention which is described in detail hereinafter and disclosed in the accompanying drawings.

In the drawings:

Fig. 2 is a side elevation on the line 2—2, Fig. 3, certain parts being removed.

Fig. 3 is a vertical longitudinal section through the gearing, the axle gears, dog gears, shafts, and certain other parts being in full lines.

Fig. 4 is a side elevation of the master gear alone, the dogs, gears, axle gears, and other parts being omitted; and Fig. 5 is a detail section on line 5—5, Fig. 2.

Figure 1:
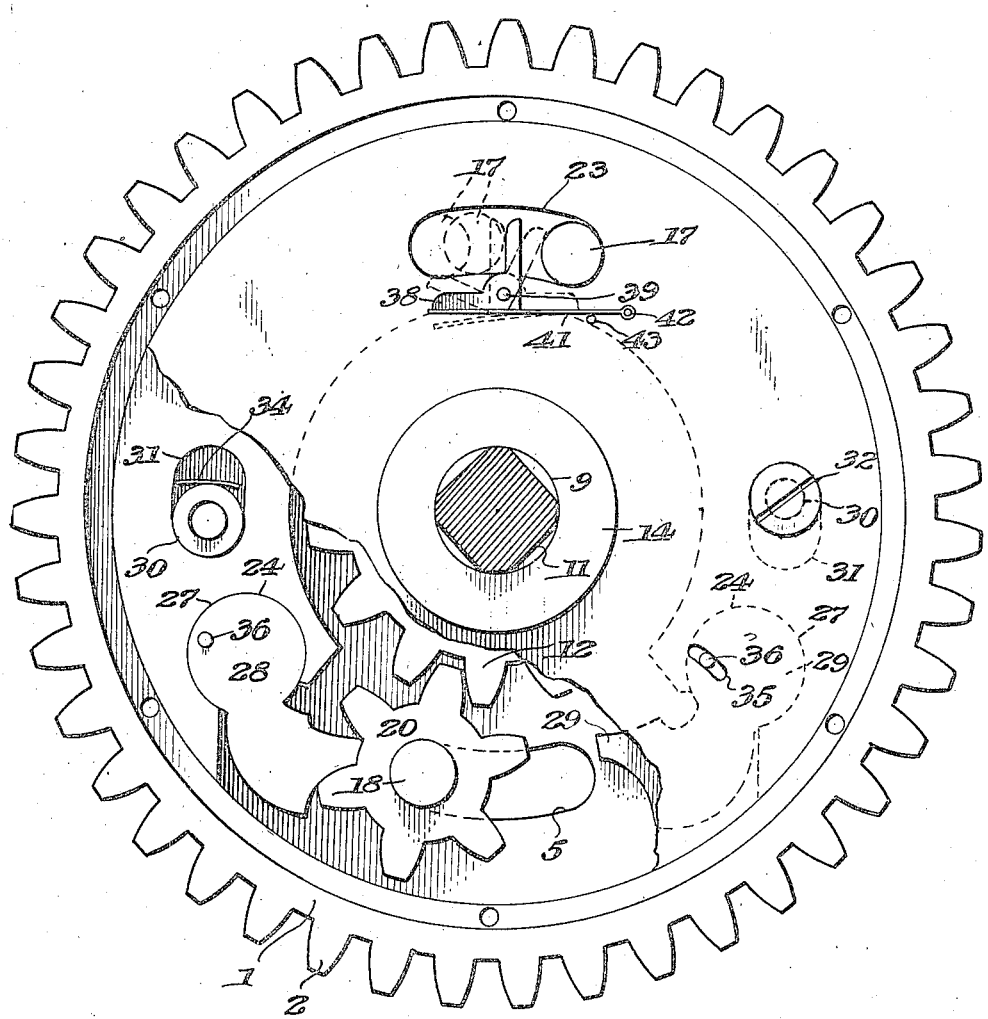
Figure 1 is a side elevation taken on the line 1—1, Fig. 3, certain parts being removed and others broken away to disclose the construction.

The master gear 1 is provided with peripherally arranged gear teeth 2 of spur, spiral, or worm type and is open at its center as shown at 3 for the accommodation of the axle gears and also is recessed on its opposite sides as shown at 4 for the pivotal mounting of the dogs and the dog gears, there being arc-shaped slots 5, extending clear through the web of the axle gear 1, for the accommodation and play of the axles of the dog gears or pinions.

The hubs 6 of the master gear 1 by which it is mounted in suitable bearings, not shown, in the axle housing, form a part of the flanged heads 7 which are rigidly bolted to the master gear 1 by the through bolts 8 so that the master gear 1 and the heads 7 constitute a unitary structure.

The axles 9 and 10 have squared ends 11, or may be provided with splines for securing thereto axle gears 12 and 13, respectively. The gears 12, 13, are located inside of the hollow center 3 and are free to turn therein. The axles 9, 10, have suitable bearings, as usual. Interposed between the hubs 14, 15, of the axle gears 12, 13, and the heads 7, are suitable anti-friction bearings 16, the heads 7 being counter-bored to receive the bearings. The bearings 16 may be arranged for taking up end thrust as well as for mounting the hubs 14, 15, and it is not essential to my invention just how the anti-friction bearings are arranged for the hubs 14, 15, axles 9, 10, and hubs 7.

The gears 12, 13, are of the same number of teeth and diameter, and it is through these gears that the driving power is transmitted to the axles 9, 10, and from them to the ground wheels of the car.

Journaled in the arc-shaped slots 5 and also adapted for bodily shifting in said slots lengthwise thereof are the axles 17, 18, which carry the dog gears or pinions 19, 20, which are constantly in mesh with the pinions 12 and 13, respectively. The dog pinions 19, 20, constitute the means for transmitting from the master gear 1 to the axle gears 12, 13, the driving power required for the axles 9, 10. The position of the dog gears 19, 20, will vary, according to tractive requirements imposed by the axles 9, 10, on the axle gears 12, 13, as will appear hereinafter.

There are two floating rings 21, 22, which have arc-shape slots 23, (Fig. 1) corresponding to the arc-shape slots 5 in the master gear 1 for the accommodation of the axles 17, 18, of the dog gears 19, 20.

The master gear 1 is provided on one side with nearly complete circular pockets 24 which constitute the pivotal mountings for dogs 25, 26, and on its other side and at diametrically opposite points it has similar pockets 27 constituting the pivotal connection for a similar pair of dogs 28, 29. This manner of pivotally mounting the dogs 25, 26, 28, 29, insures great strength of the connection and does away with the provision of pivot pins, the dogs being shaped to snugly and easily fit in the nearly circular pockets 24, 27. The dogs may have one or more teeth but only one tooth is shown on each dog, said teeth being adapted to engage the dog gears or pinions 19, 20, and lock said pinions against rotation according to the position of the dog pinions, it being understood that only one dog is engaged with a dog pinion at a given time.

The dogs 25, 26, and 28, 29, are simultaneously actuated toward or away from each other by the shifting of the rings 21, 22. The rings 21, 22, are rigidly coupled together by spacers 30 which extend through short slots 31 running entirely through the master gear 1 and having their shoulder ends clamped rigidly against the rings 21, 22 by screws 32.

Suitable springs 34 which are secured to the master gear 1, project into the slots 31 and bear against the spacers 30 to place the rings 21, 22, under tension to hold the spacers 30 in the end of the slots 31 as shown in Figs. 1 and 2.

Suitable operative connections are provided between the dogs 25, 26, 28, 29, and the rings 21, 22, for the purpose of simultaneously moving said dogs when the rings are shifted. These connections may be pin and slot connections 35 of which one is shown in Fig. 1. As shown these connections comprise radial slots in the rings 21, 22 and pins 36 carried by the dogs 25, 26, 28, 29. The tendency of the springs 34 is to so actuate the coupled rings 21, 22, that the dogs 25, 26, will normally be moved toward each other and the dogs 28, 29, will be moved toward each other.

For the purpose of maintaining the dog gears 19, 20, in engagement with the particular dog with which they have become engaged, according to conditions, there is provided a retaining mechanism which is shown in Figs. 1 and 3 which may be arranged in recesses 37 provided in the rings 21, 22, or in the heads 7. These recesses are shown provided in the heads 7. A bell crank latch 38, which is pivoted at 39, has one of its legs 40 bearing on the axle 17 (or 18) and its other leg engaged by a leaf spring 41 which is secured at 42 and bears against the stop 43. Different positions of the dog gear axle and of the bell crank retainer 40 are shown in Fig. 1. A pair of these retaining mechanisms is used in connection with the axle 17 and another pair in connection with axle 18.

The dog gears 19 and 20 are always in engagement with their respective axle gears 12 and 13 and each is adapted to assume any one of the three positions representing "ahead," "neutral," and "reverse." When power is applied to the master gear 1, the dogs 25 and 29, or 26 and 28, engage with the dog gears 19 and 20, and the latter always being in mesh with the axle gears 12 and 13, the dog gears 19 and 20 are locked and hence cannot rotate with their axles 17 and 18 and, consequently, there is a locked relationship between the master gear 1 and the axle gears 12 and 13 so that the axle gears rotate as a unit with the master gear at the same speed. If, however, one wheel of the automobile or truck has occasion to revolve faster than the master gear 1, it will cause the axle gear (12 or 13) carried by the axle of said wheel, to rotate the given dog gear (19 or 20) and force the given dog gear along the length of the slot 5, permitting it to idle or rotate on its own axle (17 or 18), thus effecting a "differential" action. During this operation the dogs remain in their former position because the other dog gear (19 or 20) is continuing to apply power from the master gear to the axle gear for the other wheel of the automobile or truck. When both axle gears 12 and 13 rotate faster than the master gear 1, both dog gears 19 and 20 are forced into neutral position. This permits the springs 34 to rotate the rings 21 and 22 and brings the proper dogs (25 and 29 or 26 and 28) into engagement with the respective gears 19 and 20, whereupon the master gear 1 and the axle gears 12 and 13 rotate at the same speed. When the engine is reversed, the same functions will be performed, in reverse order, except when a differential action takes place.

The bell crank retainers 38 prevent the opposite dog from engaging the dog gear when a differential action is taking place but when both dog gears 19 and 20 are in neutral position, the bell cranks 38 are forced to turn and come to the opposite position. In brief, the bell crank retainers are held in either of two positions by the springs 41 which will not interfere with a differential action being performed in connection with either axle gear and will insure the application of power for turning both wheels of the automobile or truck at all times.

When a differential action is taking place, the bell crank tends to keep the dog gear in mesh with the dog but permits the gear to move it around a certain arc so that the dog gear will turn. When both wheels rotate faster than the master gear, the springs 34 force rings 21 and 22 around, causing the bell crank to assume a position in the reverse direction. After the bell crank turns through a certain angle, the action of the spring 41 tends to suddenly force the bell crank to the other position.

I claim:

1. In a differential gearing, the combination with a master gear, of dog gears carried by, and bodily movable in relation to, the master gear, pairs of dogs carried by the master gear, the members of each pair being adapted to independently cooperate with a given dog gear, and independent axle gears respectively meshing with the dog gears aforesaid.

2. In a differential gearing, the combination with a master gear, of dog gears carried by, and bodily movable in relation to, the master gear, pairs of dogs carried by the master gear, the members of each pair being adapted to independently cooperate with a given dog gear, means carried by the master gear and movable in relation thereto for simultaneously operating all of the dogs, and independent axle gears respectively meshing with the dog gears aforesaid.

3. In a differential gearing, the combination with a master gear, of dog gears carried by, and bodily movable in relation to, the master gear, pairs of dogs carried by the master gear, the members of each pair being adapted to independently cooperate with a given dog gear, means carried by the master gear and arranged for movement in relation thereto adapted for simultaneously operating all of the dogs, springs cooperating with the master gear and with said means whereby the connection between said means and said master gear is of a yielding nature, and independent axle gears respectively meshing with the dog gears aforesaid.

4. In a differential gearing, the combination with a master gear provided with sockets or seats of general circular form, of dogs pivotally or rockably connected to the master gear by their engagement with said seats, dog gears carried by the master gear and being adapted for movement in relation thereto so that said dogs may independently engage them, and independent axle gears respectively meshing with the dog gears aforesaid.

5. In a differential gearing, the combination with a master gear provided with sockets or seats of general circular form, of dogs pivotally or rockably connected to the master gear by their engagement with said seats, dog gears carried by the master gear and being adapted for movement in relation thereto so that said dogs may independently engage them, coupled members carried by the master gear and adapted for movement in relation thereto which are operatively connected to the dogs by pin and slot connections whereby all of the dogs are made to move simultaneously, and independent axle gears respectively meshing with the dog gears aforesaid.

6. In a differential gearing, the combination with a master gear, of pairs of dogs pivotally mounted thereon, dog gears carried by the master gear and adapted for movement in relation thereto, said dog gears being adapted for independent engagement by different ones of the different dogs, coupled rings located on opposite sides of the master gear and carried thereby which are also adapted for limited rotation in relation to the master gear, operative connections between the rings and all of the dogs whereby all of said dogs are simultaneously operated by said rings, and independent axle gears respectively meshing with the dog gears aforesaid.

7. In a differential gearing, the combination with a master gear having slots, of dog gears having shafts slidable and rotatable in said slots, pivoted dogs carried by the master gear and arranged in pairs for the respective dog gears, said dogs being located so that they are adapted for independent engagement with a given dog gear, means carried by the master gear for effecting the shifting of the dogs, and independent axle gears respectively meshing with the dog gears aforesaid.

8. In a differential gearing, the combination with a master gear having slots, of dog gears having shafts slidable and rotatable in said slots, pivoted dogs carried by the master gear and arranged in pairs for the respective dog gears, said dogs being located so that they are adapted for independent engagement with a given dog gear, coupled rings carried by the master gear which are adapted for limited yieldable relative rotation in relation thereto, said rings having slots to receive the shafts of the dog gears, said rings also having operative connections with the dogs whereby the dogs are simultaneously operated when said rings turn in relation to the master gear, and independent axle gears respectively meshing with the dog gears aforesaid.

9. In a differential gearing, the combination with a master gear, of dog gears carried thereby which are adapted both to slide and to turn in relation to the master gear, pairs of dogs carried by the master gear, the members of which are adapted to independently engage the given dog gears, means for operating the dogs, automatically acting retainers cooperating with the axles of the dog gears to hold them where set, and independent axle gears respectively meshing with the dog gears aforesaid.

10. In a differential gearing, the combination with a master gear, of dog gears carried thereby which are adapted both to slide and to turn in relation to the master gear, pairs of dogs carried by the master gear, the members of which are adapted to independently engage the given dog gears, means for operating the dogs, independent flop-over bell crank retainers cooperating with the shafts of the respective dog gears adapted to hold them where set, and independent axle gears respectively meshing with the dog gears aforesaid.

In testimony whereof I affix my signature.

DANIEL A. FLYNN.